US005961005A

United States Patent [19]

Pichonnier et al.

[11] Patent Number: 5,961,005

[45] Date of Patent: Oct. 5, 1999

[54] RECEPTACLE FOR SEMI-SOLID SUBSTANCES AND HAVING A NON-ROUND FOLLOWER PISTON

[75] Inventors: Pascal Pichonnier, Francheville; Garcia Firmin, Evreux, both of France

[73] Assignee: Valois S.A., Le Neubourg, France

[21] Appl. No.: 08/722,254

[22] PCT Filed: Apr. 7, 1995

[86] PCT No.: PCT/FR95/00451

§ 371 Date: Feb. 14, 1997

§ 102(e) Date: Feb. 14, 1997

[87] PCT Pub. No.: WO95/27664

PCT Pub. Date: Oct. 19, 1995

[30] Foreign Application Priority Data

Apr. 12, 1994 [FR] France .................................. 94 04293

[51] Int. Cl.[6] .................................................. G01F 11/00

[52] U.S. Cl. ........................................ 222/321.7; 222/386

[58] Field of Search ............................. 222/321.7, 321.9, 222/380, 386

[56] References Cited

U.S. PATENT DOCUMENTS

| | | | |
|---|---|---|---|
| 4,869,403 | 9/1989 | Bruning | 222/386 |
| 5,267,673 | 12/1993 | Crosnier et al. | 222/321.7 |
| 5,449,094 | 9/1995 | Behar et al. | 222/386 |

FOREIGN PATENT DOCUMENTS

| | | | |
|---|---|---|---|
| 526 811 | 6/1993 | European Pat. Off. . | |
| 653310 | 11/1928 | France | 222/386 |
| 88 15 089 U | 5/1990 | United Kingdom . | |

*Primary Examiner*—Joseph A. Kaufman
*Attorney, Agent, or Firm*—Sughrue, Mion, Zinn, Macpeak & Seas, PLLC

[57] ABSTRACT

A receptacle (1) for containing a semi-solid substance, has an oblong cylindrical body surmounted by a neck for receiving a dispenser device of the type that does not allow ingress of air. The receptacle includes a follower piston (2) that slides with sealing contact inside the oblong cylindrical body as substance is expelled. The follower piston has an outer contact periphery (21) of oblong shape including two portions of greater curvature (21') defined by a pair of circular arcs having the same radius of curvature. The arcs being disposed opposite each other in first mirror symmetry (Sr) and being connected to each other by two connection segments (21"). Preferably, each of the two connection segments (21") is defined by at least one circular arc.

4 Claims, 1 Drawing Sheet

RECEPTACLE FOR SEMI-SOLID SUBSTANCES AND HAVING A NON-ROUND FOLLOWER PISTON

BACKGROUND OF THE INVENTION

The present invention relates to a receptacle for containing a semi-solid substance such as a cream, a gel, or an emulsion. More particularly, the receptacle is designed to be used in association with a dispenser device of the type that prevents ingress of air, i.e. the volume of substance taken from the receptacle by the dispenser device is not replaced by a corresponding volume of air. Under such circumstances, two solutions can be envisaged: a first consists in packaging the semi-solid substance in a flexible bag which shrinks as the substance is dispensed by the dispenser device, which may be a pump for example. A second solution consists in fitting the receptacle with a follower piston which rises in sealed manner within the receptacle in steps each of a size corresponding to a volume of substance taken from the receptacle. It is thus the piston that produces the reduction in volume.

It is already known in the prior art to fit receptacles of round cross-section with such follower pistons. There is no particular technical difficulty in making a mold for a round follower piston, nor in using the mold, given that both the mold and the part to be molded are accurate bodies of revolution.

It is also known from the prior art to make receptacles of cross-section other than round. A receptacle of that type is particularly adapted for use with a dispenser device allowing ingress of air or for use with a flexible bag. This is because it is difficult to make a follower piston that is not round, since the sealing contact between the inside face of the receptacle and the sealing contact lip of the follower piston is no longer round. With a round piston, the sealing contact force is exerted radially and uniformly against the inside face of the receptacle. In contrast, with a non-round piston, it is not possible to obtain a good fit for the sealing contact or a uniform force over the inside periphery of the receptacle under the same conditions as apply with a perfectly round piston.

Like many other parts, follower pistons are made by molding, i.e. by injecting heated plastics material into a mold. As it cools, the initially expanded plastics material contracts, thereby leaving an empty gap. The gap is thus a direct physical consequence of heat loss due to contact between the hot plastics material and the cooler mold. This must be taken into account by the mold so as to obtain a plastics material part having the desired dimensions. Thus, the mold must be slightly larger than the desired final part so as to be able to compensate for the material shrinking. In practice, mold makers give a mold its final dimensions that take account of shrinkage by retouching the mold using appropriate tooling, e.g. a wire electro-erosion machine. This operation is performed empirically until a mold is obtained that has the appropriate dimensions, given shrinkage.

For a round follower piston, the retouching operation is relatively simple. Parts having axial symmetry, such as a round piston, are molded by injection at the center, i.e. hot semi-liquid plastics material penetrates radially into the mold and reaches the outermost portions corresponding to the sealing lips of the follower piston all at the same time. The shrinkage phenomenon therefore affects the molded part uniformly over its entire periphery. This simplifies retouching work since it must be performed uniformly at the periphery. The retouching machine can then be programmed in simple manner to work on a circle. This technique is well known in the prior art and is specially adapted for dimensioning molds for round follower pistons.

For making a follower piston that is other than round, such retouching work is still required. However, it is no longer possible to program the retouching machine with a working path that is as simple as a circle. Further, since the piston is not round, when the plastics material is injected at the center, it does not reach all of the extreme portions corresponding to the sealing lips simultaneously. The semi-liquid plastics material must travel along a path inside the mold which is not radially uniform. Since the piston is not round, there are necessarily extreme portions of the mold which are further than others from the center where injection takes place. Unfortunately, the shrinkage phenomenon is proportional to the thickness of the part. Portions further away from the injection center are therefore more severely affected by the shrinkage phenomenon than are other portions closer to the injection center. More retouching work is therefore required on such portions remote from the injection center. The complexity of the shape combined with the non-uniformity of the shrinkage phenomenon make retouching work practically impossible to perform. The retouching machine becomes unprogrammable.

SUMMARY OF THE INVENTION

The object of the present invention is to remedy the above-mentioned drawbacks inherent to manufacturing non-round follower pistons.

To do this, the present invention provides a receptacle for containing a semi-solid substance, said receptacle comprising an oblong cylindrical body surmounted by a neck for receiving a dispenser device of the type that does not allow ingress of air, said receptacle including a molded plastics follower piston that slides with sealing contact inside said oblong cylindrical body as substance is expelled from said receptacle, the receptacle being characterized in that the follower piston has an outer contact periphery of oblong shape including two portions of greater curvature defined by a pair of circular arcs having the same radius of curvature, said circular arcs being disposed opposite each other in first mirror symmetry and being connected to each other by two connection segments. By making the follower piston in this way, the two portions of greatest curvature are reduced to the case of an accurately round piston. The machine can be programmed on a circle and worked over a circular arc corresponding to the curvature of said end portions. Also, in practice it is necessary only to retouch those portions of greatest curvature that are situated furthest from the injection center, since the other portions of the mold are subject to the shrinkage phenomenon only to a very small extent. This is explained by the fact that the minimum thickness of such a receptacle is much smaller than the diameter of a round receptacle for the same content. That is why the shrinkage phenomenon affects substantially only the portions of greatest curvature, and they are the only portions that require retouching work.

Advantageously, each of the two connection segments is defined by at least one circular arc. Preferably, the connection segments are defined by a pair of circular arcs having the same radius of curvature and disposed opposite each other in second mirror symmetry perpendicular to the first mirror symmetry. Defining connection segments in this way gives rise to a perfectly oval shape with central symmetry. In the event that retouching work should also be necessary on the connection segments, this is possible by programming the retouching machine using a circle of corresponding curvature. Thus, by adjusting the retouching machine on two occasions only, the mold for the follower piston can be dimensioned accurately.

BRIEF DESCRIPTION OF THE FIGURES

The invention is described below with reference to the accompanying drawing, showing one embodiment of the invention by way of non-limiting example. In the drawing.

DETAILED DESCRIPTION OF THE PREFERRED EMBODIMENT

Figure 1:
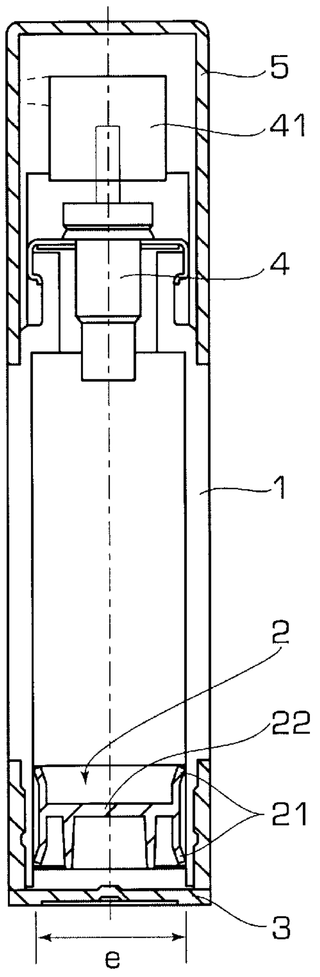
FIG. 1 is a side section view of a dispenser for a semi-solid substance and incorporating the present invention.
Figure 2:
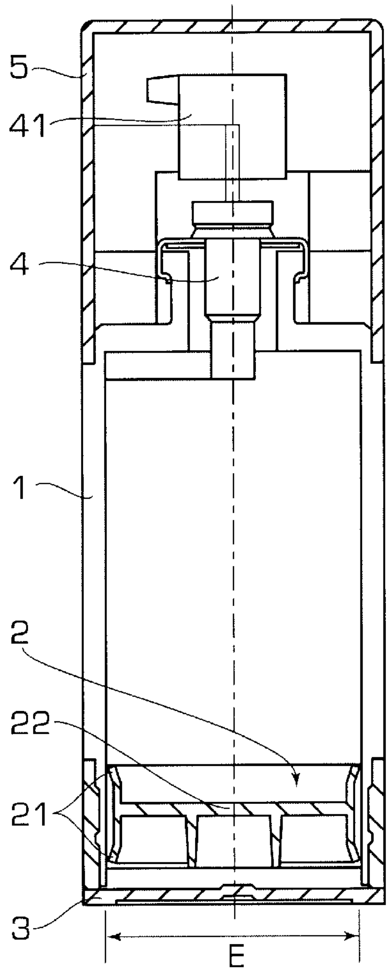
FIG. 2 is a front section view of the FIG. 2 dispenser.
Figure 3:
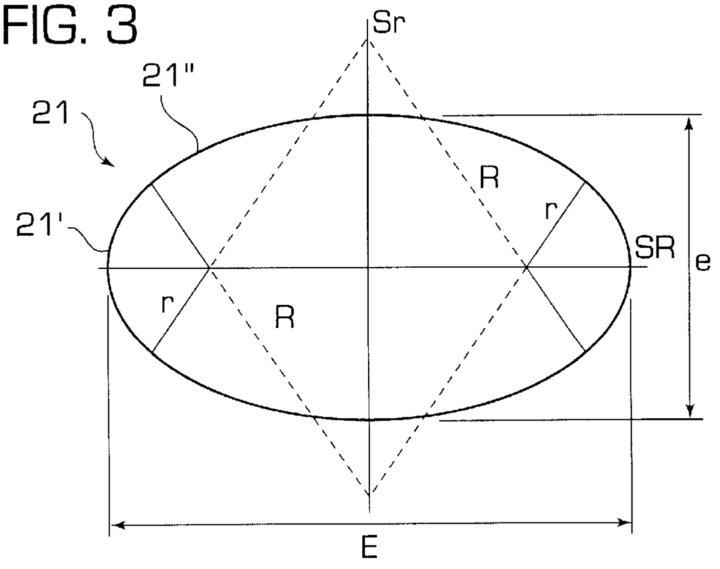
FIG. 3 is a diagrammatic representation of the contact-making outer periphery of a follower piston made in accordance with the present invention.

The dispenser of FIGS. 1 and 2 is essentially constituted by a receptacle or tank 1 having an oblong cylindrical body that is oval in shape and that has central symmetry. The top of this body has a neck that receives a dispensing device which, in this case, is a pump 4. To protect the pump, a cap 5 is provided that covers the pump and that snap-fastens to the receptacle. Since the subject matter of the present invention is not associated with the structure of the pump used, its component parts are not described. Nevertheless, the pump used must be of a certain type, specifically one that does not allow ingress of air. To make this possible, a follower piston 2 is provided inside the receptacle 1 so as to compensate for the volume of substance dispensed by the pump. A bottom closure member 3 is engaged by snap-fastening and finishes off the receptacle 1. Each time the pushbutton 41 of the pump 4 is released, the pump chamber fills with a certain volume of the substance. Simultaneously with the pump chamber filling, the follower piston 2 rises inside the receptacle 1 towards the pump over a distance corresponding to the volume that has been extracted. The follower piston 1 has a wall 22 that is oval in shape and relatively plane, constituting the bottom of the receptacle 1. This wall 22 extends substantially perpendicularly to the axis on which the piston 2 moves inside the receptacle. Said wall 22 is surrounded by an oval sleeve whose top and bottom ends form two sealing lips 21 in sealing contact with the inside of the receptacle 1. The outer contact periphery of the follower piston 2 is thus defined by said sealing lips 21.

According to the invention, this outer contact periphery 21 has two portions of greater curvature 21' defined by a pair of circular arcs having the same radius of curvature r and disposed opposite each other in first mirror symmetry Sr. In addition, in the embodiment described herein, these circular arcs of the same radius r are connected to each other by two connection segments 21" defined by another pair of circular arcs having the same but different radius of curvature R greater than r and disposed opposite each other in second mirror symmetry SR, perpendicular to Sr. Thus, the outer contact periphery 21 of the follower piston 1 is perfectly oval in shape and has central symmetry. Naturally, the points where the various circular arcs connect together are such that the periphery 21 is entirely regular, i.e. the derivatives of the oval curve on either side of said connection points are equal, i.e. the circles are mutually tangential at their points of connection.

Because of the above-explained questions of facilitating mold retouching, the inside shape of the receptacle is tied to the shape of the outside periphery 21 of the follower piston whose portions of greatest curvature are advantageously made, according to the invention, as circular arcs. In the embodiment described, the connection segments 21" are also circular arcs of radius R, but naturally it is possible to adopt segments 21" of other shapes without going beyond the ambit of the present invention. For example, the segments could be straight lines connected to semicircles, thereby causing the outer contact periphery 21 to be perfectly oblong in shape, which amounts to making R tend towards infinity.

Nevertheless, it is preferable for all of the outer contact periphery 21 to be made in the form of touching circular arc segments. An outer contact periphery provides better sealing if it presents a certain degree of curvature towards the outside. It is more difficult to make sealing lips that provide good sealing on rectilinear portions of a follower piston since the lip is not urged against the flat inside surface of the receptacle in which the piston slides.

By experiment, it has been observed that to ensure that the piston 2 is properly held inside the receptacle 1, the ratio of the longest dimension E of the piston to its shortest dimension e should be less than about three.

We claim:

1. A receptacle (1) for containing a semi-solid substance, said receptacle comprising: an oblong cylindrical body surmounted by a neck for receiving a dispenser device that does not allow ingress of air, said receptacle including a molded plastics follower piston (2) that slides with sealing contact inside said oblong cylindrical body as substance is expelled from said receptacle, wherein the follower piston has an outer contact periphery (21) of oblong but non-elliptical shape including two end portions (21') defined by a pair of circular arcs having the same, constant radius of curvature, said circular arcs being disposed opposite each other in first mirror symmetry (Sr) and being connected to each other by two connection segments (21") of lesser curvature than said arcs.

2. A receptacle according to claim 1, in which each of the two connection segments (21") is defined by at least one circular arc.

3. A receptacle according to claim 1, in which the connection segments (21") are defined by a pair of circular arcs having the same radius of curvature and disposed opposite each other in second mirror symmetry (SR) perpendicular to the first mirror symmetry.

4. A receptacle according to claim 2, in which the connection segments (21") are defined by a pair of circular arcs having the same radius of curvature and disposed opposite each other in second mirror symmetry (SR) perpendicular to the first mirror symmetry.

* * * * *